United States Patent [19]
Hayes

[11] 3,944,053
[45] Mar. 16, 1976

[54] CONVEYOR SYSTEMS

[75] Inventor: Michael Richard Hayes, Preston, England

[73] Assignee: British Nuclear Fuels Ltd., Warrington, England

[22] Filed: Nov. 4, 1974

[21] Appl. No.: 520,869

[30] Foreign Application Priority Data
Dec. 6, 1973  United Kingdom............ 56702/73

[52] U.S. Cl............................ 198/64; 198/215
[51] Int. Cl.².................... B65G 47/16; B65G 33/00
[58] Field of Search ...... 198/213, 215, 64; 138/122; 259/89, DIG. 24; 214/17 R, 17 CB, 18 R, 18 N, 21; 222/406, 412, 413

[56] References Cited
UNITED STATES PATENTS

| | | | |
|---|---|---|---|
| 2,457,461 | 12/1948 | Graae | 198/215 |
| 3,135,296 | 6/1964 | Kelstrom et al. | 138/122 |
| 3,351,181 | 11/1967 | Allen et al. | 198/215 |
| 3,460,722 | 8/1969 | Jung | 214/17 R |
| 3,471,063 | 10/1969 | Jung et al. | 198/215 |

*Primary Examiner*—Evon C. Blunk
*Assistant Examiner*—Joseph E. Valenza
*Attorney, Agent, or Firm*—Larson, Taylor & Hinds

[57] ABSTRACT

A conveyor system in which free flowing granules or particles are conveyed through a flexible tube having a helical channel defined on the internal surface of the tube by rotating the tube about its longitudinal axis.

7 Claims, 1 Drawing Figure

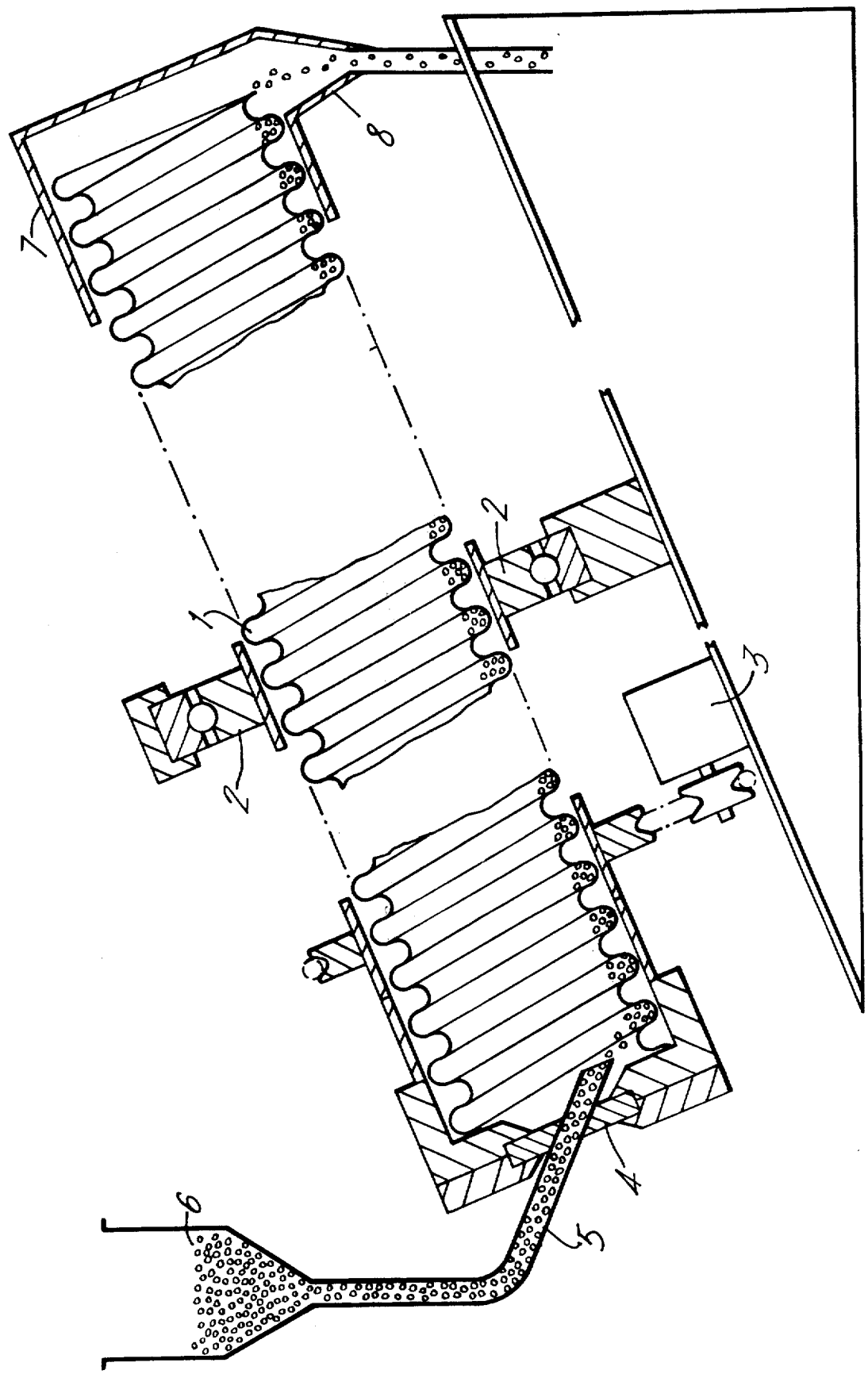

CONVEYOR SYSTEMS

BACKGROUND OF THE INVENTION

This invention relates to conveyor systems, particularly for the conveyance of small spherical particles such as those produced as nuclear fuel material.

SUMMARY OF THE INVENTION

According to the present invention a conveyor system comprises a flexible tube, a helical channel defined on the internal surface of the tube, means for rotating the tube about its longitudinal axis, a rotatable seal closing one end of the tube, means for feeding material in the form of free flowing granules or particles to the tube through the rotatable seal and means for collecting and discharging the material at the other end of the tube.

The tube may be of any desired length and may be supported if necessary by free-running bearings at intervals along its length. It can convey material uphill, downhill, on the level and round corners. It can also give complete containment and thus is particularly suitable for radioactive materials.

Preferably the tube is provided with helical corrugations to define the helical channel.

DESCRIPTION OF THE DRAWING

The invention will now be described by way of example only with reference to the accompanying drawing which is a diagramatic side view.

DESCRIPTION OF THE PREFERRED EMBODIMENT

In the drawing is shown a flexible helically corrugated tube 1 supported on free-running bearings 2 and rotatable by a drive motor 3. At the lower end of the tube 1 is a rotatable seal 4 through which extends a delivery tube 5 from a feed hopper 6. At the upper end of the tube 1 is a cap 7 free to rotate relative to the tube 1. The cap 7 is shaped to form a tundish 8 through which material can be discharged. In operation of the system material from the hopper 6 is fed through the delivery tube 5 into the corrugated tube 1 which is rotated by the motor 3 so as to move the fed material along the corrugated tube to the cap 7.

A conveyor system in accordance with the invention discharges material in increments on each revolution. It has been found that these increments are of a quite precisely similar amount. If, therefore, the conveyor tube is synchronised to a moving belt or table, for example, such that a fresh container is positioned below the discharge point for each turn or for a number of turns of the tube then the system can be used to measure out reproducible increments of material. In this respect the system is simpler and can operate much faster than presently available weight/volume filling equipment widely used in the packaging industry. In this application of the invention the size of the increment can be varied by altering the diameter of the tube together with the width and depth of the corrugations.

I claim:

1. A conveyor system comprising a flexible tube, a helical channel defined on the internal surface of the tube, means for rotating the tube about its longitudinal axis, a rotatable seal closing one end of the tube, means for feeding material in the form of free flowing granules or particles to the tube through the seal, and means for collecting and discharging the material at the other end of the tube.

2. A conveyor system as claimed in claim 1 wherein the tube is provided with helical corrugations to define the helical channel.

3. A conveyor system as claimed in claim 1 wherein said material feeding means is stationary.

4. A conveyor system as claimed in claim 1 wherein said tube is inclined upwardly at least in the area of said feeding means such that material is conveyed upwardly upon entering said tube from said feeding means.

5. A conveyor system as claimed in claim 1 wherein the inclination of said tube over at least part of its length is such as to preclude flow of said material along said tube independently of rotation of said tube, such that conveyance of material is governed by rotation of said tube and the attendant material moving effect of said helical channel.

6. A conveyor system as claimed in claim 1 wherein the inclination of said tube at said closed one end where said material is fed to the tube is such as to preclude flow of said material along said tube independently of rotation of said tube, such that conveyance of said fed material away from said closed end is governed by rotation of said tube and the attendant material moving effect of said helical channel.

7. A conveyor system as claimed in claim 1 wherein the inclination of said tube at said other end is such as to preclude flow of said material from said tube independtly of rotation of said tube, such that discharge of material from said other end occurs in increments on each revolution, the size of the increment depending upon the diameter of the tube and the width and depth of said helical channel at said other end.

* * * * *